United States Patent
Baker

[19]

[11] Patent Number: 6,015,964
[45] Date of Patent: Jan. 18, 2000

[54] ELECTRIC ARC WELDER WITH CONTROLLED ARC

[75] Inventor: Ivan E. Baker, Concord, Ohio

[73] Assignee: Lincoln Global, Inc., Cleveland, Ohio

[21] Appl. No.: 09/126,790

[22] Filed: Aug. 3, 1998

[51] Int. Cl.[7] .................................................. B23K 9/09
[52] U.S. Cl. .................. 219/130.33; 219/130.5; 219/137 PS
[58] Field of Search ......... 219/130.33, 130.31, 219/130.32, 130.5, 130.51, 137 PS

[56] References Cited

U.S. PATENT DOCUMENTS

| | | | |
|---|---|---|---|
| 4,469,933 | 9/1984 | Mizuno et al. | 219/137 PS |
| 4,889,969 | 12/1989 | Kawai et al. | 219/130.51 |
| 5,148,001 | 9/1992 | Stava | 219/137 PS |
| 5,637,246 | 6/1997 | Ikegami . | |
| 5,726,419 | 3/1998 | Tabata et al. | 219/130.51 |

Primary Examiner—Clifford C. Shaw
Attorney, Agent, or Firm—Vickers, Daniels & Young

[57] ABSTRACT

In an electric arc welder for creating an electric arc for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator and an error amplifier for generating the command signal in accordance with a set point voltage, the improvement comprising: first set point means for creating a fixed set point voltage, second set point means for creating a ramp set point voltage increasing at a selected rate from a starting voltage to create a selected slope, a toggle means having a first toggled condition for connecting said first set point means to the error amplifier and a second toggled condition for connecting said second set point means to the error amplifier, means for creating a short signal when the wire shorts against the workpiece and means for toggling the toggle means from said first condition into said second condition in response to a short circuit signal.

29 Claims, 5 Drawing Sheets

ELECTRIC ARC WELDER WITH CONTROLLED ARC

The present invention relates to the art of electric arc welding and more particularly to an electric arc welder and method of operating such welder.

INCORPORATION BY REFERENCE

Most D.C. welders are single stage or double stage inverters for converting a D.C. power source into a controlled D.C. welding current by using a pulse width modulator to create a series of current pulses that have controlled duty cycles to define the parameters of the welding operation. For many years it has been known to use a D.C. chopper having a pulse width modulator controlled switching device for applying discrete current pulses from a D.C. power source across a welding station. Many patents disclose D.C. choppers used in welding. One of these many patents is Ikegami U.S. Pat. No. 5,637,246, which is incorporated by reference herein. This patent shows the architecture of a down chopper used for controlling an engine driven arc welder, with a switching device controlled by a comparator between the sensed actual current and a desired reference signal created by a circuit associated with the down chopper. The general architecture and control arrangement for D.C. choppers used as an arc welder are illustrated in this patent. Although a chopper in this prior art patent is operated by the engine driven generator, the D.C. input source for the down chopper is often a rectifier controlled by a single phase or a three phase power supply. The present invention is particularly adapted for engine driven units similar to Ikegami U.S. Pat. No. 5,637,246; however, it is equally applicable for a down chopper using a rectified input to define the D.C. input source of the down chopper or a single or double stage inverter.

BACKGROUND OF INVENTION

The present invention is particularly applicable for use in controlling the arc of an arc welder driven by a D.C. power supply in the form of an inverter or down chopper. Such welders, especially when operated in the MIG mode, require a large inductor to provide a soft arc. However, in a D.C. welder using a chopper or inverter, the desired current waveforms at the arc can be provided when using a relatively small inductor. Thus, these prior welders do not provide a soft arc to prevent spatter when the waveform is critical. The arc characteristics of the D.C. welders are often controlled by the size of the choke and are not optimized, especially between short circuit conditions in a MIG welding cycle. Thus there is a need for a D.C. welder of the chopper or inverter type which controls the characteristics of the arc without need for a large choke that is detrimental to the waveform.

THE INVENTION

The present invention relates to a D.C. arc welder of the chopper or inverter type, which employs a small choke while controlling the characteristics of the arc so there is a softness of the arc during the arc condition while maintaining the necessary current flow when the MIG process is in the short circuit condition and as it transitions from the short circuit condition back to the arc or plasma condition. In accordance with the invention, the D.C. welder is operated in a constant voltage control mode with a minimum current override to prevent extinguishing the arc. The welding cycle is controlled independent of the size of the choke. In accordance with the invention, the minimum current during the constant voltage control of the D.C. welder can be adjusted to control the softness of the arc independent of the actual inductance in the output circuit of the welder. When the MIG welding cycle is in the short circuit condition, the invention releases control of the arc to provide a desired current profile optimizing the electric pinch. In summary, the invention contemplates a D.C. welder with a constant voltage control independent of the size of the choke. By using a preset minimum current level during the constant voltage portion of the MIG welding cycle, the arc is maintained between successive short circuit conditions. The arc voltage itself is monitored and averaged for controlling the power supply during the arcing condition of the welding cycle. Thus, the current is modulated to keep the arc voltage constant until the short circuit condition exists, at which time the D.C. welder is converted to current control creating the desired current profile during the short and during transition from the short condition to the arc or plasma condition. In this manner, the arc of the welding cycle is optimized between the successive short circuit conditions. The short circuit and the transition portions of the cycle are optimized by using a current control procedure.

In accordance with the present invention there is provided an improvement in an electric arc welder for creating an electric arc for melting and depositing metal from an advancing welding wire onto a workpiece, which welder includes a power supply having a switch operated by a pulse width modulator for creating a series of current pulses having a fixed frequency and a conduction width determined by the command voltage of a control signal driving the pulse width modulator with means for sensing the arc voltage, means for sensing the arc current and an error amplifier for generating the command signal for the pulse width modulator in accordance with the set point voltage on a set point input and the feedback voltage on a feedback input. The improvement to this type of D.C. welder, which can be a chopper or inverter, involves changing the voltage on the set point input of the error amplifier between a fixed voltage and a voltage having an increasing ramp or an increasing and then decreasing ramp. The voltage is increased at a selected rate from a starting point voltage to create a selected slope at the set point voltage input of the error amplifier. In another embodiment, the voltage is decreased as the short circuit transitions to a plasma. A toggle arrangement is provided with a first toggled condition for connecting the set point input to the fixed voltage and a second toggled condition for connecting the set point input to the ramped voltage. The invention further involves the creation of a short signal when the wire electrode shorts against the workpiece. The short causes the toggling means to shift from the fixed voltage input to the ramp voltage input. Between short circuit conditions in the welding cycle, a voltage feedback is used by the error amplifier and the toggle means is toggled to the fixed voltage set point. In this manner, the D.C. power supply has a preselected constant voltage control until there is a short circuit condition to create a short circuit signal. The short circuit signal toggles the set point input to the error amplifier to a ramped voltage. The set point voltage is immediately ramped upward to control the current flow during the short circuit. The electric pinch action in the molten metal between the electrode and workpiece is increased until a fuse breaks the short. In the preferred embodiment, the current is controlled to ramp down to the fixed set point voltage. Thus, the MIG welding cycle has a constant voltage during the arcing condition and a current control during the short circuit condition or during the short circuit and transition condition.

In accordance with another aspect of the invention, when the D.C. welder is operated in the condition utilizing a fixed set point voltage, there is provided an override for preventing the arc current from dropping below a selected minimum current. Thus, the arc will not be extinguished. By adjusting this minimum current, the softness of the arc is controlled without regard to the inductance in the welding circuit. In the preferred implementation of the present invention, the constant voltage operation during the arc portion of the MIG welding cycle is constant voltage with a selected minimum current override. This is a novel process, especially when combined with the current controlled operation during the short circuit portion of the welding cycle or during the short circuit and transition portion of the cycle.

The minimum current used during the arcing condition controls the softness or stiffness of the arc. In addition, the slope of the ramp used during the short condition dictates the electric pinching action of the shorted molten metal. By adjusting the minimum current and the increasing slope of the ramp, in an inverse relationship, the characteristic of the arc is optimized.

The primary object of the present invention is the provision of a D.C. welder of the chopper or inverter type, which welder has an arc condition substantially independent of the size of the inductor.

Another object of the present invention is the provision of a D.C. welder, of the type defined above, which D.C. welder operates in a MIG mode with a constant voltage and a minimum current override during the arcing portion of the welding cycle.

Still a further object of the present invention is the provision of a D.C. welder, as defined above, which D.C. welder utilizes ramped current control, both up and down, between the constant voltage portions of the welding cycle. The ramps or slopes of the ramped current are preselected and are followed because the output inductor or choke is small.

Yet another object of the present invention is the provision of a method of operating a D.C. welder of the type defined above, which method involves a constant voltage during the arcing portion of the cycle with a minimum current override in combination with a ramped current control during the short circuit condition of the cycle or during the short circuit and then transition portion of the cycle.

Another object of the present invention is the provision of a D.C. welder, which welder operates primarily at the minimum current level during times of low wire feed speed, even though it is a constant voltage control mode. Thus, the invention utilizes a constant voltage control with the current override to combine these two operating conditions for the purposes of controlling the arc of the D.C. welder and maintain smooth electrode feed at low speeds.

Still a further object of the present invention is the provision of a D.C. welder that can be operated in the MIG mode to provide a soft arc or an accurately controlled pinch so the arc is controlled without regard to the size of the inductor.

Yet another object of the present invention is the provision of a D.C. welder, which welder is controlled in the manner defined above where the setting of the increasing and decreasing ramp slopes during the current control and the minimum current override during the constant voltage operation combine to set the "inductance" or softness of the arc. The arc welder has a rapid response time so the current will follow the increasing and decreasing ramp during the short circuit portion of the welding cycle.

Still another object of the present invention is the provision of a D.C. welder, of the type defined above, which welder operates in a current mode during the short circuit condition and as the welding cycle is in transition between the short circuit condition and back to the set point voltage where the cycle is a constant voltage operation with a minimum current override.

These and other objects and advantages will become apparent from the following description taken together with the accompanying drawings.

PREFERRED EMBODIMENT

Figure 1:
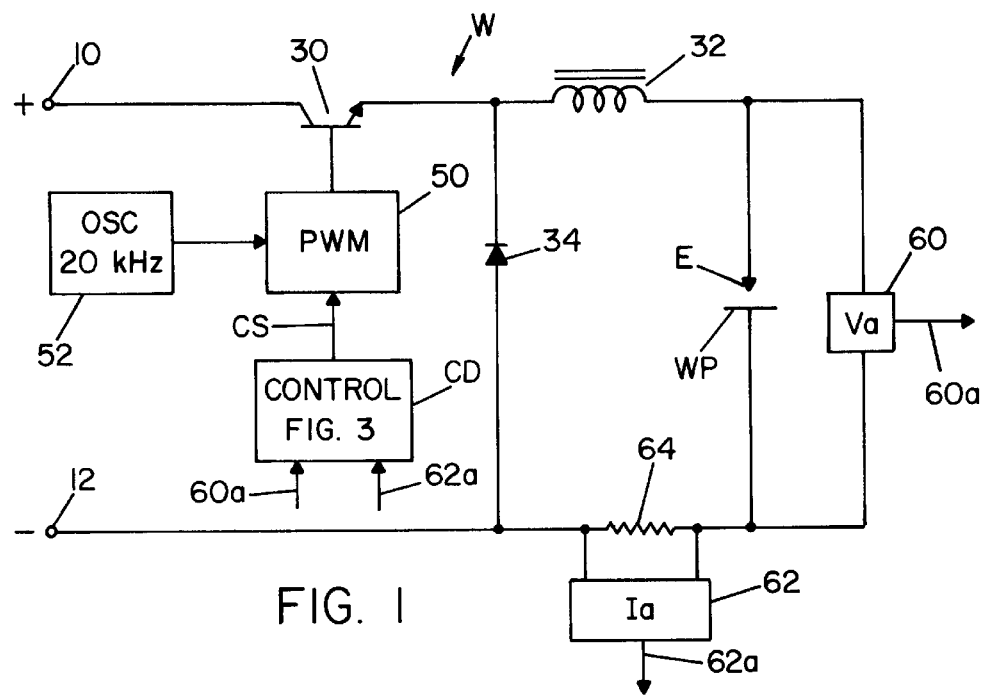
FIG. 1 is a schematic wiring diagram illustrating a D.C. welder of the chopper type for implementing the present invention.
Figure 1A:
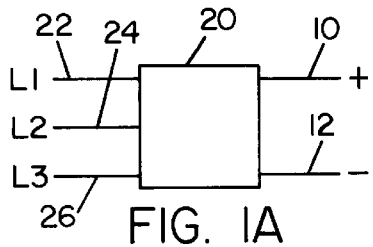
FIG. 1A is a schematic diagram illustrating an input stage for the D.C. power supplies shown in FIGS. 1 and 2.
Figure 2:
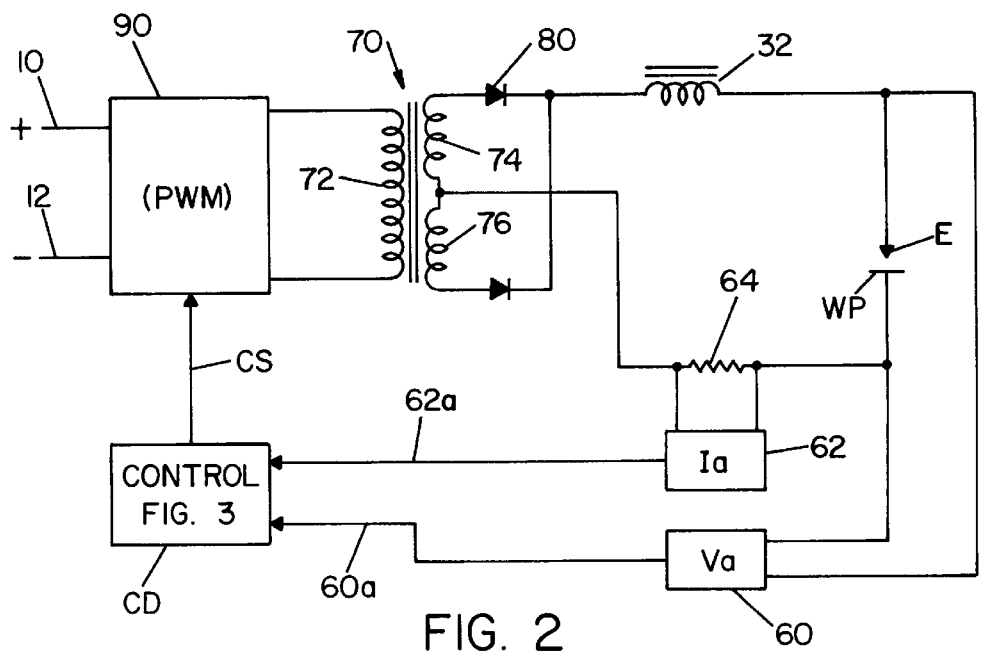
FIG. 2 is a D.C. welder of the inverter type for practicing the present invention.

Referring now to FIGS. 1 and 1A, D.C. welder W is of the switching type and includes a power supply with D.C. terminals 10, 12. The power supply can either be a motor generator or a rectifier 20, as shown in FIG. 1A, with alternating current inputs 22, 24 and 26. The D.C. voltage across terminals 10, 12 is switched to create a D.C. current across an electrode of advancing wire E and a workpiece WP. The current has a waveform controlled by a rapidly operating switch 30 passing current pulses through a small inductor 32. The standard freewheeling diode 34 completes the welding circuit. In switching power supplies, inductor or choke 32 is relatively small so that the rapid pulses of current through switch 30 have a controlled profile or waveform determined by the duty cycle of the switch. In practice, the switch is operated by a pulse width modulator 50 in accordance with the voltage of a command signal line CS from a control device CD, as shown in FIG. 2. Oscillator 52 causes switch 30 to operate at a high frequency, normally 20 kHz. The level of the voltage in the command signal line CS determines the magnitude or duty cycle of each pulse occurring at the frequency of oscillator 52. In this manner, the current waveform across electrode E and workpiece WP has a desired shape or a desired parameter determined by control device CD. Arc voltage is sensed by device 60 and provides a voltage proportional to arc voltage in line 60a. In a like manner, the arc current is sensed by device 62 and shunt 64 to provide a voltage in line 62a proportional to the sensed arc current. The voltages on lines 60a, 62a constitute the feedback signals of control device CD for controlling switch 30 of welder W in accordance with the invention.

Referring now to FIG. 2, a standard inverter type D.C. welder is illustrated wherein the components discussed with respect to FIG. 1 have like letters and numbers. In this type D.C. welder a transformer 70 includes a primary winding 72 and two secondary windings 74, 76, which secondary windings provide a D.C. current output by action of rectifier 80. The inverter stage 90 is controlled by a pulse width modulator and has switches to alternately switch current through primary windings 72, 74 of transformer 70 at duty cycles discussed with respect to the operation of the chopper shown in FIG. 1.

Figures 3, 3A:
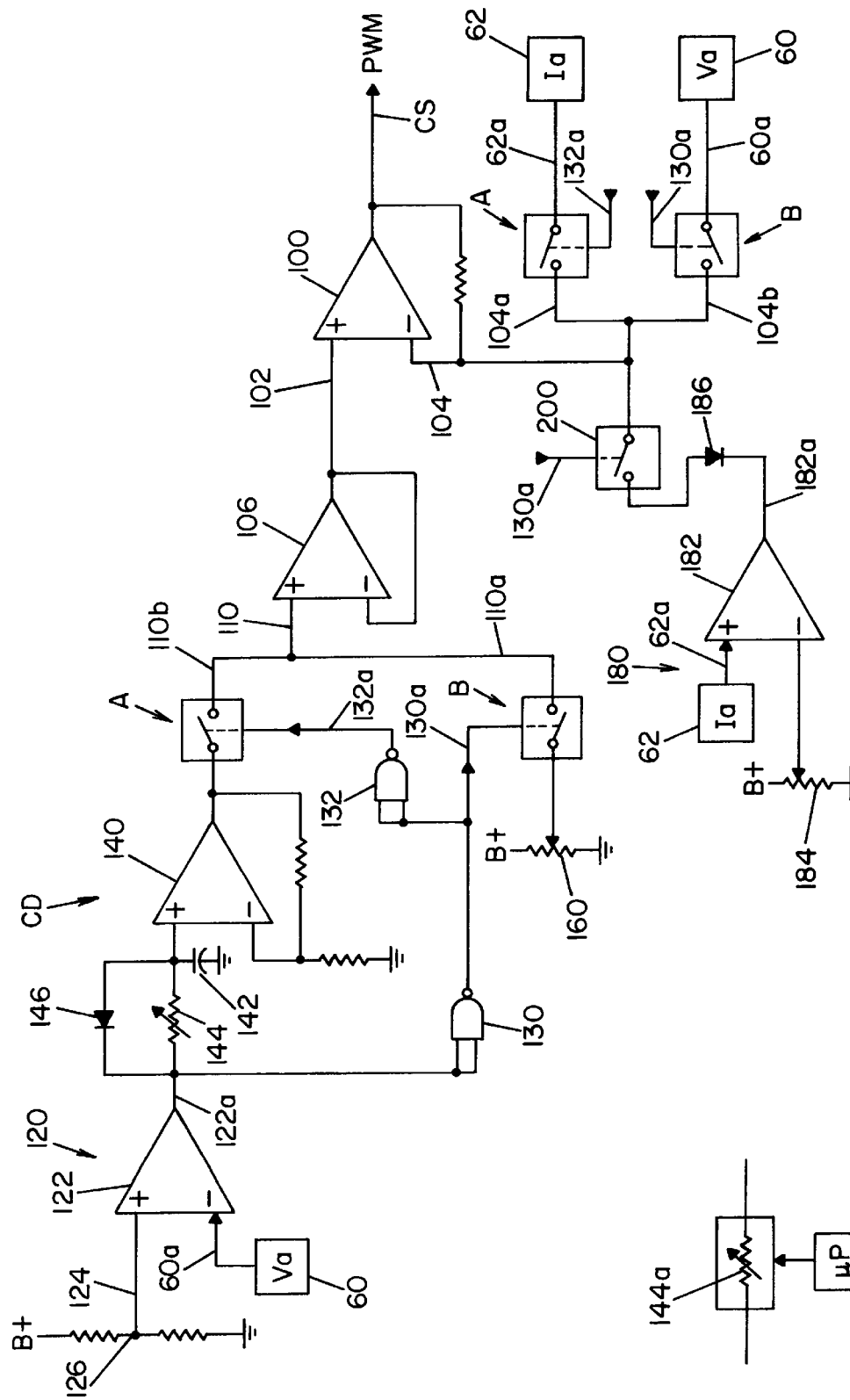
FIG. 3 is a block diagram illustrating the preferred embodiment of the present invention.
FIG. 3A is a schematic block diagram illustrating the use of a microprocessor for controlling a digital potentiometer chip to change the resistance of the current ramp network used in the preferred embodiment of the present invention.

The present invention relates to control device CD for controlling the switching type D.C. welder as schematically illustrated in FIGS. 1 and 2, or another similar switching type welder, used for MIG welding. The arcing portion of the cycle has a constant voltage and the short circuit portion of the cycle, or both the short circuit and transition portion of the cycle, has a current controlled to develop a preselected current profile. In accomplishing this objective, the first embodiment of the present invention shown in FIG. 3 involves a somewhat standard error amplifier 100 with a positive set point input 102 and a negative feedback input 104. The output of the error amplifier is command signal line CS for controlling the D.C. welder in FIGS. 1 and 2. To create a voltage at set point input 102, which follows the feedback voltage in lines 104, there is a set point buffer 106 having an input line 110. The voltage on input line 110 is controlled by the voltage on line 110a or the voltage on line 110b. The particular line driving buffer 106 is controlled by the closing of either switch A or switch B, which shift the voltage on set point input 102. Switches A and B have several separate contacts as shown in FIG. 3. Control device CD is toggled between a first toggled condition with switch B closed. This toggle condition provides a fixed, but adjustable, set point voltage on input line 110a. In the same manner, closing of switch A provides a second toggled condition with a ramped up voltage on input line 110b.

To toggle or shift between closing of switch A and closing of switch B, there is provided a toggle mechanism 120 constituting a comparator 122 which has an output on line 122a that shifts to a fixed high voltage when the sensed arc voltage on line 60a is less than the set voltage on line 124 at the output of voltage divider 126. When there is a short circuit between advancing wire electrode E and workpiece WP, the sensed voltage on line 60a immediately drops. The voltage output line 122a shifts to a fixed high voltage. This voltage creates a logic 0 at the output 130a of NAND gate 130. Such logic creates a logic 1 at the output of NAND gate 132 at output 132a to close switch A and open switch B. With switch A closed, ramp generator, or ramp amplifier, 140 is controlled by the voltage on capacitor 142, which capacitor is charged through an adjustable resistor or rheostat 144. Thus, the voltage on line 110b ramps upwardly at a slope determined by the setting of resistor 144. This increased voltage drives set point buffer 106 to increase the set point voltage on input 102 of error amplifier 100. At this time, switch A is closed; therefore, feedback 104 of error amplifier 100 is controlled by the voltage on line 104a, which is the sensed arc current voltage on line 62a. As the voltage on line 102 ramps upward, under control of ramp amplifier 140, the welding operation is controlled so the sensed current is driven upward to cause a pinching action of the metal constituting the short circuit. When the short circuit is terminated, i.e. a fuse, the voltage on line 60a rapidly increases causing a low voltage on line 122a. This discharges capacitor 142 and provides a logic 1 in output line 130a of gate 130 so switch A is opened and switch B is closed. This toggled condition disconnects ramp amplifier 140 allowing discharge of capacitor 142 through resistor 144. In practice, resistor 144 is a digital potentiometer chip DS 1267 which has a resistance in 144a controlled by the microprocessor as shown in FIG. 3A. Other arrangements could be employed for adjusting the desired resistance of resistor 144. In the first toggled condition of the toggle mechanism 120 with switch B closed, the set point voltage on buffer 106 is the voltage on line 110a controlled by voltage divider 160. The adjusted position of this voltage divider, or rheostat, applies a fixed voltage on line 110 to create a fixed voltage on set point input 102 of error amplifier 100. The closing of switch B directs the arc voltage on line 104b as the feedback voltage, to input 104 of error amplifier. This is the first toggled condition and is the arc portion of the MIG welding cycle. In this condition, error amplifier 100 provides a voltage on command control line CS to cause the arc voltage to be the voltage of the set point from rheostat 160. As so far explained, when there is a short circuit in the MIG welding cycle, the voltage on line 122a shifts up to toggle control device CD into a second toggled condition where gate 132 closes switch A and gate 130 opens switch B. Thus, feedback line 104 is controlled by the arc current and set point 102 has a controlled ramp voltage with a slope determined by resistor 144. When the pinch action terminates a short circuit at a fuse, the voltage on line 122a shifts downward opening switch A and closing switch B. This causes the welder to be operated at a constant voltage adjusted by rheostat 160. Thus, the welder is operated in a constant voltage mode during the arcing portion of the welding cycle, i.e. during the first toggle condition, and is controlled by current to create a predetermined ramp current during the short circuit portion of the cycle, i.e. during the second toggled condition. The two toggled conditions shift voltage control by arc voltage Va and current control by arc current Ia.

Figure 5:
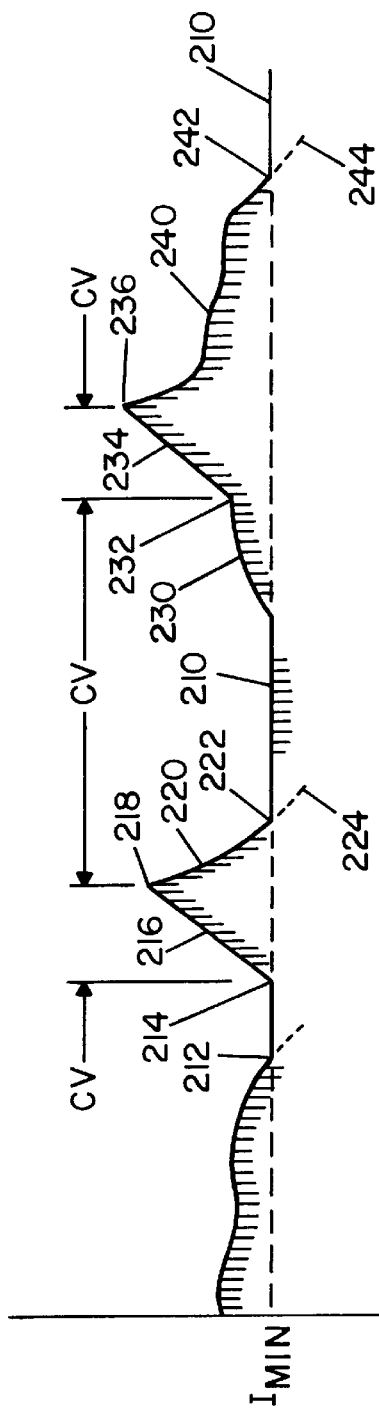
FIG. 5 is a graph of the current during a MIG welding operation using the preferred embodiment of the present invention shown in FIG. 3.

In accordance with another aspect of the present invention, a minimum current circuit is applied to feedback input 104. This concept has been used before by applicant and is illustrated in FIG. 3. When output line 130a is at a logic 1, minimum current control 180 is energized. This control involves comparator 182 having one input controlled by rheostat 184 and another input controlled by a voltage proportional to the sensed arc current. This voltage is on line 62a. When the arc current attempts to drop below a preset minimum current adjusted by rheostat 184, output 182a of comparator 182 is grounded. This grounds feedback line 104 through diode 184 by switch 200. Thus, whenever the current tends to drop below the adjusted minimum current, error amplifier 100 has an increased voltage on command signal line CS to maintain the current at the set minimum current. Thus, during the constant voltage operation, with switch B closed, there is an override control that maintains the current above a set minimum current. This operation is schematically illustrated in the current graph of FIG. 5. The minimum current set by rheostat 184 is indicated as horizontal line 210. During the constant voltage condition CV, the welder is controlled to maintain the voltage on feedback input 104 at a fixed voltage level. As indicated at point 212, when the current necessary to maintain the adjusted constant voltage attempts to drop below line 210, the minimum current control 180 takes over operation of the error amplifier. The constant voltage mode is overridden to maintain the minimum current. When there is a short as illustrated by point 214, switch A is closed and switch B is opened. Then ramp generator or amplifier 140 causes the current to be ramped along line 216 until the short circuit is broken, or a fuse is created, at point 218. At that moment, control device CD toggles back to the constant voltage operation due to a drop in the voltage on line 122a. When that occurs, there is a gradual decrease or tailout of the current along line 220. In the second embodiment of the invention this tailout is controlled by maintaining current control to point 222. At point 222, irrespective of the embodiment used, the arc current of the welder intersects line 210 and attempts to plunge downwardly, as indicated by dashed line 224. Minimum current control 180 prevents this action and holds the output at the minimum current along line 210. As the current increases above the minimum level to maintain the constant voltage, as schematically shown by line 230, a short circuit ultimately occurs at point 232. Control device CD then toggles into the second toggled condition and again creates a controlled ramp current along line 234. The slope of this line is the same as the slope of line 216, even though it occurs at a higher initial current level. When the fuse indicated at point 236 is created, the welder is again toggled into the constant voltage mode of operation and the current decreases along an appropriate line which is indicated by curved line 240. At point 242 the arc current tends to drop below the minimum current level indicated by line 210. This is shown by dashed line 244. When that occurs, minimum current control 180 is activated causing the current to bottom out at the minimum current level. The particular waveform shown in FIG. 5 is merely illustrative in nature and presented for the purposes of illustrating the concepts used in the preferred embodiment of the present invention. The particular current waveforms will vary according to the electrical parameters of the It welding operation.

Figure 5A:
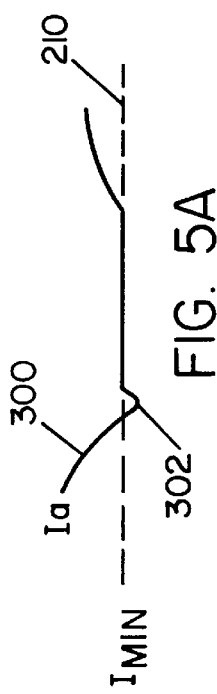
FIG. 5A is a partial current graph showing the relationship of the actual sensed current with the set minimum current when using the preferred embodiment of the present invention, as illustrated in FIG. 3.

There will be a normal delay in the transfer of control between the constant voltage as controlled by the voltage on line 104b, and the minimum current of control 180. This delay is schematically shown in FIG. 5A. The arc current is represented by line 300. As the arc current tends to drop below the minimum level indicated by lines 210, there is a slight bounce where the current actually shifts slightly below the fixed minimum current. This bounce is illustrated as curve 302 in line 300. Thereafter, control 180 assumes control over the error amplifier causing the current to be maintained at the minimum level. Such minor variations in the current are insignificant in the practice of the present invention.

Figure 4A:
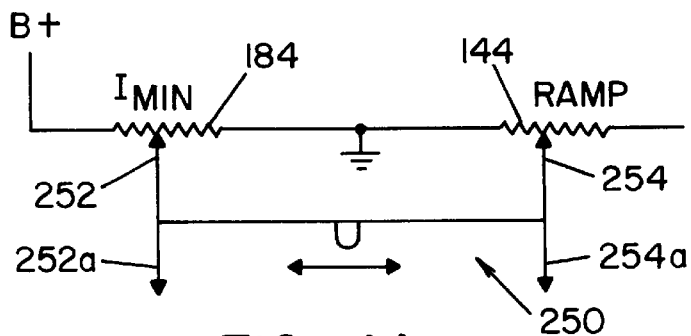
FIG. 4A is a schematic wiring diagram showing an adjustment device for coordinating the minimum current and the slope of the current ramp as shown in FIG. 4B.
Figure 4B:
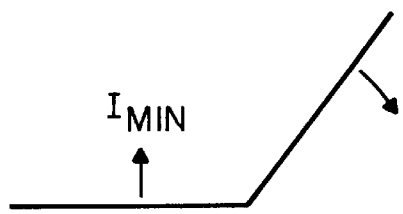
FIG. 4B is a current graph showing the operation of the adjusting device schematically illustrated in FIG. 4A.

To control the characteristics of the arc, resistor or rheostat 144 and voltage divider 184 should be adjusted in unison. As the minimum current increases, the ramp or slope of the current should decrease as indicated in FIG. 4B. This can be accomplished by an adjusting device 250 which jointly controls the resistance of resistor 144 and the voltage of rheostat 184. This concept is schematically illustrated as contacts or wipers 252, 254 having output 252a constituting the voltage output for rheostat 184 and output 254b constituting the amount of resistance in resistor 144. As the minimum current is adjusted higher, the slope of the set point ramp voltage is automatically reduced. This concept is employed for controlling the condition of the arc. The adjusting device inversely proportions the selected slope of the set point voltage and the selected minimum current. This is a secondary feature of the present invention.

Figure 6:
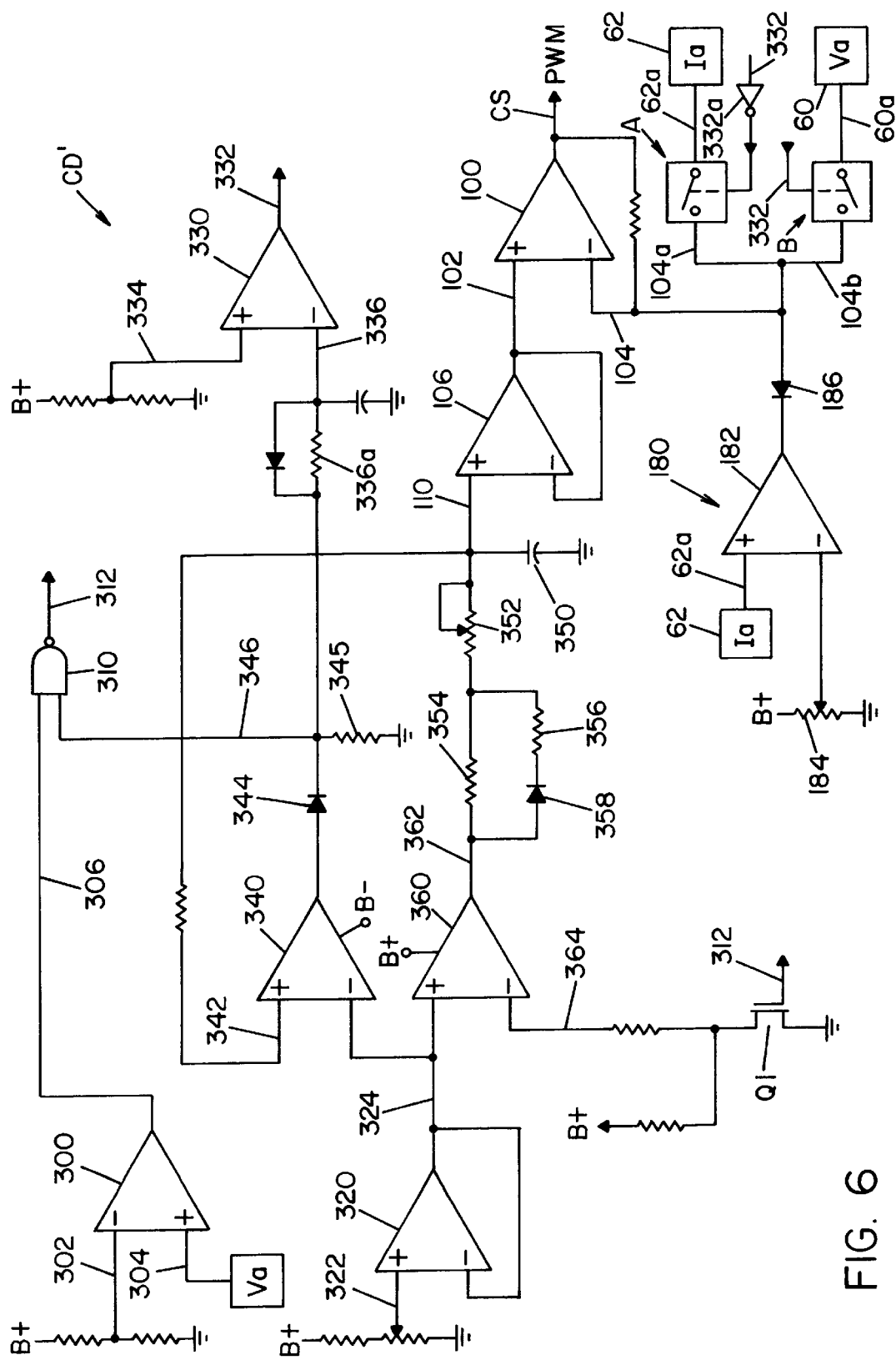
FIG. 6 is a block diagram illustrating a further preferred embodiment of the present invention; and, FIG. 7 is a graph similar to FIG. 5 showing the current during a MIG welding operation using the preferred embodiment of the present invention as shown in FIG. 6.

Referring now to the preferred embodiment illustrated in FIG. 6, control device CD' operates the welder in a constant voltage mode having a minimum current override while the arc voltage is maintained at fixed set point. At the time of the short circuit, control device CD' shifts the welder into a current mode of operation with a controlled current ramp until the short circuit breaks. At that time a controlled decreasing current ramp transitions the current from the high current obtained at the break back to the set point voltage. To accomplish this type of operation, short circuit detector 300 compares a set voltage at input 302 with the arc voltage at input 304. The logic on output line 306 shifts to a logic 0 upon detection of a short circuit. When the short circuit is broken and the welder shifts back to the arc or plasma condition, a logic 1 appears on line 306. Output line 306 forms one input logic to NAND gate 310. When there is a short circuit, a logic 0 on line 306 assures that gate 310 has a logic 1 on output line 312. The logic on line 312 controls switch Q1. A logic 1 renders switch Q1 conductive. A logic 0 from gate 310 renders the switch non-conductive. In the illustrated embodiment, set point buffer 320 has an adjustable set point voltage determined by voltage divider 322 and an output line 324 which is set to a known, constant voltage constituting the set point voltage of the control device shown in FIG. 6. As in FIG. 3, control device CD' includes a toggle to shift from mode A to mode B. Toggle amplifier 330 having a fixed voltage input 334 and a toggled output 332 which either closes switch B or through an inverter 332a closes switch A.

A logic 1 or logic 0 on line 336 determines the toggled condition. In this manner, toggle amplifier 330 toggles between the A mode and B mode as previously described with respect to FIG. 3. The toggling action is determined by the logic on line 336. The logic on line 336 causes output 332 to be high when the control device is operating at set point and in the first toggled condition for a constant voltage mode of operation with a current override by circuit 180. A low logic appears on line 332 whenever the set point voltage on line 110 is greater than the set point controlled by buffer 320. A low logic on line 332 shifts control device CD' into the current mode of operation. To control shifts in the logic on input line 336 there is provided an integration circuit 336a. The logic on line 336 is controlled by comparator 340 having the set point voltage of line 324 on its negative input and the set point voltage appearing on line 110 at the positive input 342. During constant voltage operation, line 332 is high and control device CD' maintains the voltage on line 110 (342) the same as the voltage on line 324. Comparator 340 compares the actual set point voltage on line 110 with the desired set point voltage from buffer 320. When the voltage on line 110 is near or at set point, line 336 causes line 332 to be at a high logic.

Whenever the voltage on line 110 is substantially greater than the set point voltage, comparator 340 causes toggle 330 to toggle into the second condition with a low logic on line 332. This shifts to the current control mode for control device CD'. Diode 344 and resistor 345 control the logic on line 336 as well as the logic on line 346 constituting the second input to NAND gate 310. A logic 1 appears on line 336 when the voltage on line 110 is substantially greater than the set point voltage from amplifier or buffer 320. This logic has no effect so long as a short circuit maintains the voltage on line 306 at a logic 0. However, if there is no short circuit, a logic 1 appears in both lines 306 and 346 when the voltage on line 110 is greater than the set point voltage. This causes a logic 0 on line 312 to render switch Q1 non-conductive.

The voltage on line 110 is the voltage across capacitor 350. This capacitor is charged by the voltage on line 362 which is the output of amplifier 360. The voltage on line 362 is controlled by the operation of switch Q1. When the switch is conductive, input 364 is grounded and line 362 is at B+ voltage. This charges capacitor 350 through adjustable resistor 352 and fixed parallel connected resistors 354 and 356. This forms the increasing current ramp during the short circuit condition of the welding cycle. Thereafter, when switch Q1 is non-conductive due to a logic 0 in line 312, line 362 is at a low voltage which discharges capacitor 350 back toward the set point voltage. The rate of discharge is substantially slower than the charging rate since diode 358 removes resistor 356 from the discharge path of capacitor 350. The rate of charging is greater than the rate of discharge. This provides a more gradual tailout for the current profile.

In operation of control device CD', when there is a short circuit, the voltage in line 306 shifts to a logic 0. The output of gate 310 is a logic 1 to turn on switch Q1. Amplifier 360 now has a high voltage on line 362 which charges capacitor 350 through resistors 352, 354 and 356. The voltage on line 342 of comparator 340 is increased above the set point voltage on line 324 so the output of the comparator is at a logic 1. Toggle 330 is then shifted to the current mode of operation which is a logic 0. A logic 1 is applied to gate 310 by line 346. This logic on line 346 has no effect since a logic 0 is on line 306. The voltage on line 110 ramps upward determined by the charging of capacitor 350. This increases the voltage on error amplifier 100. The error amplifier is now controlled by the arc current represented by the voltage on line 104a. Toggle amplifier 330 has shifted the control device into mode A. When the short circuit breaks and the arc or plasma reoccurs, line 306 is at a logic 1. The logic on line 346 is also high because the voltage on line 110 is greater than the set point voltage in line 324. Since there is a logic 1 condition at both inputs of gate 310, the output 312 is at a logic 0 turning off switch Q1. Amplifier 360 has a B+ at its negative terminal so line 362 shifts to a low condition. Thus, capacitor 350 discharges through resistor 352 and resistor 354 to give a slower rate of discharge of capacitor 350. Toggle amplifier 330 is still in the current mode condition, since a logic 1 is maintained at the output of comparator 340 so long as the voltage on line 110 is greater than the set point voltage of line 324. In this condition, control device CD' ramps downward toward the set point voltage determined by voltage divider 322. When the voltage on capacitor 350 reaches the set point voltage, the output of comparator 340 shifts to a logic 0. This toggles amplifier 330 to a logic 1 which is the normal constant voltage mode of operation. At the same time, a logic 0 in line 346 produces a logic 1 in output 312 of gate 310. Thus, switch Q1 is again conductive causing capacitor 350 to start charging again. When charging action exceeds the set point voltage in line 324 the output of comparator 340 shifts back to a logic 1. A logic 1 on both lines 306 and 346 cause a logic 0 at output line 312. Switch Q1 is turned off. Capacitor 350 is discharged. When it reaches the set point voltage the action repeats. This oscillation by switch Q1 determined by the output of comparator 340 is a rapid oscillation maintaining the voltage on line 110 at the set point voltage on line 324. As the voltage on line 110 tends to increase, capacitor 350 is discharged. As the voltage on line 110 tends to decrease, capacitor 350 is charged. This oscillation maintains the set point voltage during the constant voltage mode of operation determined by the toggled condition of amplifier 330. Thus, control device CD' operates in accordance with the previous description of the control device CD in FIG. 3.

Figure 7:
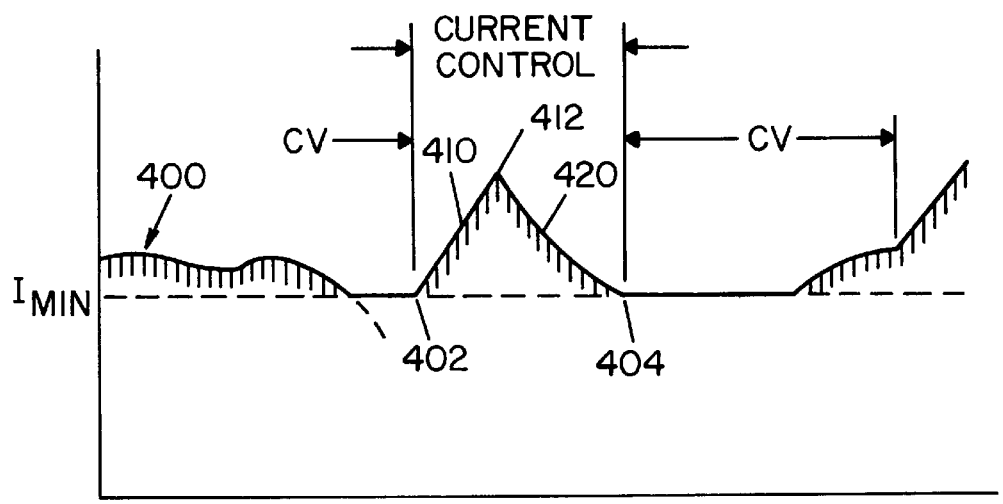

A typical current graph of the welding cycle using control CD' of FIG. 6 is illustrated in FIG. 7. A constant voltage mode of operation, with a minimum current override, is the normal operation as shown by curve 400. Current control mode is used between point 402 where a short circuit is detected and point 404 where the voltage on line 110 is again decreased to the set point voltage. The current curve includes an increasing ramp 410 at a first rate until the short circuit breaks at point 412. At that time, a decreasing current ramp 420, having a lower rate, causes the current to decrease in a controlled fashion to point 404. Then the constant voltage, with a minimum current override operation, resumes.

In practice, the control device shown in FIG. 6 is employed; however, it is possible to utilize the embodiment of the invention illustrated in FIG. 3 to control the current during the short circuit condition only.

Having thus defined the invention, the following is claimed:

1. In an electric arc welder for creating an electric arc with intermittent short circuit conditions for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator, means for sensing the arc voltage, means for sensing the arc current, and an error amplifier for generating said command signal in accordance with the set point voltage on a set point input and the feedback voltage on a feedback input, the improvement comprising: first set point means for creating a fixed set point voltage, second set point means for creating a ramp set point voltage increasing at a selected rate from a starting voltage to create a voltage having a selected increasing slope during a short circuit condition, a toggle means having a first toggled condition for connecting said first set point means to said set point input of said error amplifier while disconnecting said second set point means from said set point input and a second toggled condition for connecting said second set point means to said set point input while disconnecting said first set point means from said set point input, means for creating a short signal when said wire shorts against said workpiece, means for toggling said toggle means from said first condition into said second condition in response to said short signal, and means for applying a voltage representative of said sensed voltage to said feedback input of said error amplifier when said toggle means is in said first toggled condition.

2. The improvement as defined in claim 1 including means for applying a voltage representative to said sensed current to said feedback input of said error amplifier when said toggle means is in said second toggled condition.

3. The improvement as defined in claim 1 wherein said second set point means includes means for creating a voltage having a selected decreasing slope after a short circuit condition.

4. The improvement as defined in claim 1 including override means for preventing said arc current from dropping below a selected minimum current at least when said toggle means is in said first toggled condition.

5. The improvement as defined in claim 4 wherein said override means includes means for comparing said sensed current to a minimum current signal representative of said minimum current to create an override signal when said sensed current drops to a value at or below the current represented by said minimum current signal.

6. The improvement as defined in claim 5 including means for adjusting said selected minimum current.

7. The improvement as defined in claim 1 including first adjusting means for adjusting said selected slope of said ramp set point voltage.

8. The improvement as defined in claim 7 including second adjusting means for adjusting said selected minimum current.

9. The improvement as defined in claim 8 including means for jointly operating said first and second adjusting means for inversely proportioning the selected slope of said ramp set point voltage and said selected minimum current.

10. The improvement as defined in claim 1 wherein said short signal is a voltage of a given value.

11. A method of operating an electric arc welder including a power supply having a switch operated by a pulse width modulator for creating a series of current pulses having a fixed frequency and a conduction width determined by the command voltage of a control signal driving said pulse width modulator, said method comprising the steps of:

(a) sensing the arc voltage;

(b) sensing the arc current;

(c) providing an error amplifier for generating said command signal in accordance with the voltage on a set point input and the voltage on a feedback input;

(d) creating a fixed set point voltage;

(e) creating a ramp set point voltage increasing at a selected rate from a starting voltage to create a selected slope;

(f) providing said welder with a first condition using said fixed set point voltage as said set point input of said error amplifier or a second condition using said ramp set point voltage as said set point input of said error amplifier;

(g) creating a short signal when the welding wire of said welder shorts against the workpiece being welded by said welder;

(h) shifting said welder to said second condition in response to said short signal; and, (i) applying a voltage representative of said sensed voltage to said feedback input of said error amplifier when said welder means is in said first condition.

12. The method defined in claim 11 including the step of:

(j) applying a voltage representative of said sensed current to said feedback input of said error amplifier when said welder is in said second condition.

13. The method as defined in claim 11 including the steps of:

(j) preventing said arc current from dropping below a selected minimum current.

14. A method of operating an electric arc welder for creating an electric arc for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator, said method comprising the steps of:

(a) operating said welder in a constant voltage first mode with a minimum current override until a short is sensed between said wire and workpiece;

(b) operating said welder in a current control second mode when said short is sensed to ramp said current up at a given rate until said short is broken; and, (c) returning said welder to said first mode after a short is broken.

15. In an electric arc welder for creating an electric arc with intermediate short circuits for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator, means for sensing the arc voltage, means for sensing the arc current, and an error amplifier for generating said command signal in accordance with the voltage on a set point input and the feedback voltage on a feedback input, the improvement comprising: first set point means for maintaining a fixed set point voltage, second set point means for creating a ramp voltage increasing at a selected first rate from a known first voltage to create a voltage having a selected increasing slope, and then decreasing at a selected second rate from a known voltage to create a voltage having a decreasing slope, a toggle means having a first condition for connecting said first set point means to said set point input of said error amplifier and a second toggled condition for connecting said second set point means to said set point input means for creating a short signal when said wire short circuits against said workpiece, means for toggling said toggle means from said first condition into said second toggled condition in response to said short signal, means for applying a voltage representative of said sensed voltage to said feedback input of said error amplifier when said toggle means is in said first toggled condition and means for shifting from said increasing rate to said decreasing rate when said short current shifts to an arc.

16. The improvement as defined in claim 15 including means for applying a voltage representative to said sensed current to said feedback input of said error amplifier when said toggle means is in said second toggled condition.

17. The improvement as define din claim 15 wherein said first rate is greater than said second rate.

18. The improvement as defined in claim 15 including override means for preventing said arc current from dropping below a selected minimum current at least when said toggle means is in said first toggled condition.

19. The improvement as defined in claim 18 wherein said override means includes means for comparing said sensed current to a minimum current signal representative of said minimum current to create an override signal when said sensed current drops to a value at or below the current represented by said minimum current signal.

20. The improvement as defined in claim 15 including means for adjusting at least one of said first and second rates.

21. A method of operating an electric arc welder for creating an electric arc with intermittent short circuits for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator, said method comprising the steps of:

(a) operating said welder in a constant voltage first mode with a minimum current override until a short is sensed between said wire and workpiece;

(b) operating said welder in a current control second mode when said short is sensed to ramp said current up at a given first rate until said short is broken and then ramp said current down at a given second rate; and, (c) returning said welder to said first mode when a short is broken and said current is ramped down to a given level.

22. In an electric arc welder for creating an electric arc with intermediate short circuits for melting and depositing metal from an advancing welding wire onto a workpiece, said welder including a power supply having a switch operated by a pulse width modulator for creating a series of current pulses having a fixed frequency and a conduction width determined by the command voltage of a control signal driving said pulse width modulator and an error amplifier for generating said command signal in accordance with a set point voltage, the improvement comprising: first set point means for creating a fixed set point voltage, second set point means for creating a ramp set point voltage above said fixed set point voltage, a toggle means having a first toggled condition for using the fixed voltage of said first set point means of said error amplifier and a second toggled condition for using ramp set point voltage of said second set point means as the set point voltage of said error amplifier, means for creating a short signal when said wire short circuits against said workpiece and means for toggling said toggle means from said first condition into said second condition in response to said short signal.

23. The improvement as defined in claim 22 wherein said second set point means includes means for creating a voltage increasing at a first rate during a short circuit and then decreasing at a second rate.

24. The improvement as defined in claim 23 including means for maintaining said welder in a constant voltage mode during said first toggled condition.

25. The improvement as defined in claim 24 including means for maintaining said welder in a current control mode during said second toggled condition.

26. The improvement as defined in claim 25 including override means for preventing said arc current from dropping below a selected minimum current at least when said toggle means is in said first toggled condition.

27. The improvement as defined in claim 24 including override means for preventing said arc current from dropping below a selected minimum current at least when said toggle means is in said first toggled condition.

28. The improvement as defined in claim 22 including means for maintaining said welder in a constant voltage mode during said first toggled condition.

29. The improvement as defined in claim 28 including override means for preventing said arc current from dropping below a selected minimum current at least when said toggle means is in said first toggled condition.

* * * * *